(12) United States Patent
Davis et al.

(10) Patent No.: US 8,361,311 B2
(45) Date of Patent: Jan. 29, 2013

(54) INTEGRATED VACUUM RESID TO CHEMICALS CONVERSION PROCESS

(75) Inventors: S. Mark Davis, Humble, TX (US); Larry Lee Iaccino, Seabrook, TX (US); Richard C. Stell, Houston, TX (US); Steven E. Silverberg, Seabrook, TX (US); Jiunn-Shyan Liou, Bridgewater, NJ (US); Howard Freund, Neshanic Station, NJ (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 363 days.

(21) Appl. No.: 12/833,485

(22) Filed: Jul. 9, 2010

(65) Prior Publication Data
US 2012/0006722 A1  Jan. 12, 2012

(51) Int. Cl.
*C10G 9/28* (2006.01)
(52) U.S. Cl. ........ 208/126; 208/125; 208/127; 208/130; 585/648
(58) Field of Classification Search .................. None
See application file for complete search history.

(56) References Cited

U.S. PATENT DOCUMENTS

| | | | |
|---|---|---|---|
| 3,487,006 | A | 12/1969 | Newman et al. |
| 3,617,493 | A | 11/1971 | Wirth et al. |
| 3,671,424 | A | 6/1972 | Saxton |
| 3,898,299 | A | 8/1975 | Jones |
| 4,065,379 | A | 12/1977 | Soonawala et al. |
| 4,180,453 | A | 12/1979 | Franck et al. |
| 4,210,520 | A | 7/1980 | Wernicke et al. |
| 4,257,871 | A | 3/1981 | Wernicke et al. |
| 4,411,769 | A | 10/1983 | Oldweiler |
| 4,975,181 | A | 12/1990 | Tsao |
| 5,024,751 | A | 6/1991 | Giuliani et al. |
| 5,413,702 | A | 5/1995 | Yan |
| 5,952,539 | A | 9/1999 | Seimandi et al. |
| 6,179,993 | B1 | 1/2001 | Seimandi et al. |
| 6,210,561 | B1 | 4/2001 | Bradow et al. |
| 6,632,351 | B1 | 10/2003 | Ngan et al. |
| 7,090,765 | B2 | 8/2006 | Spicer et al. |
| 7,097,758 | B2 | 8/2006 | Stell et al. |
| 7,138,047 | B2 | 11/2006 | Stell et al. |
| 7,138,097 | B1 | 11/2006 | Zones et al. |

(Continued)

FOREIGN PATENT DOCUMENTS

| | | |
|---|---|---|
| FR | 2 768 154 | 12/1999 |
| WO | WO 01/66672 | 9/2001 |

(Continued)

OTHER PUBLICATIONS

P.J. Ellis and C.A. Paul, Tutorial: Delayed Coking Fundamentals, paper 29a, Topical Conference on Refinery Processing, 1998 Great Lakes Carbon Corporation [online], [retrieved on Jun. 15, 2010]. Retrieved from the Internet <URL: http://www.coking.com/DOCKTUT.pdf>.

*Primary Examiner* — Tam M Nguyen

(57) ABSTRACT

A process and apparatus for cracking a hydrocarbon feed containing resid, comprising: heating a hydrocarbon feedstock containing resid; passing said heated hydrocarbon feedstock to a vapor/liquid separator; flashing said heated hydrocarbon feedstock in said vapor/liquid separator to form a vapor phase and a liquid phase containing said resid; passing at least a portion of said resid-containing liquid phase from said vapor/liquid separator to a thermal conversion reactor operating at 649° C. or more, wherein the thermal conversion reactor contains coke particles; and converting at least a portion of said resid into olefins.

23 Claims, 1 Drawing Sheet

U.S. PATENT DOCUMENTS

| | | |
|---|---|---|
| 7,193,123 B2 | 3/2007 | Stell et al. |
| 7,220,887 B2 | 5/2007 | Stell et al. |
| 7,678,264 B2 | 3/2010 | Bhan |
| 7,718,839 B2 | 5/2010 | Baumgartner et al. |
| 2006/0094918 A1 | 5/2006 | McCoy et al. |
| 2007/0023845 A1 | 2/2007 | Ohta |
| 2007/0090018 A1 | 4/2007 | Keusenkothen et al. |
| 2007/0090019 A1 | 4/2007 | Keusenkothen et al. |
| 2007/0090020 A1 | 4/2007 | Buchanan et al. |
| 2009/0156876 A1 | 6/2009 | Ou et al. |
| 2009/0272671 A1 | 11/2009 | Keusenkothen |
| 2010/0174130 A1 | 7/2010 | Spicer et al. |
| 2010/0300936 A1* | 12/2010 | Stell et al. ............ 208/130 |
| 2011/0011768 A1* | 1/2011 | Keusenkothen ............ 208/14 |
| 2012/0006723 A1* | 1/2012 | Davis et al. ............ 208/54 |

FOREIGN PATENT DOCUMENTS

| | | |
|---|---|---|
| WO | WO 2007/117919 | 10/2007 |
| WO | WO 2007/117920 | 10/2007 |
| WO | WO 2009/025640 | 2/2009 |

* cited by examiner

US 8,361,311 B2

INTEGRATED VACUUM RESID TO CHEMICALS CONVERSION PROCESS

CROSS REFERENCE TO RELATED APPLICATIONS

This application is related to concurrently filed application U.S. Ser. No. 12/833,556. This invention also relates to U.S. Ser. No. 12/692,222 (filed Jan. 22, 2010).

FIELD OF THE INVENTION

The invention relates to a method of making olefins from a crude or resid-containing crude fraction.

BACKGROUND OF THE INVENTION

Thermal cracking of hydrocarbons is a petrochemical process that is widely used to produce olefins such as ethylene, propylene, butylenes, butadiene, and aromatics such as benzene, toluene, and xylenes. Each of these is a valuable commercial product in its own right. For instance, the olefins may be oligomerized (e.g., to form lubricant basestocks), polymerized (e.g., to form polyethylene, polypropylene, and other plastics), and/or functionalized (e.g., to form acids, alcohols, aldehydes and the like), all of which have well-known intermediate and/or end uses. One thermal cracking process is steam cracking, which involves cracking hydrocarbons at elevated temperatures in the presence of steam or gas mixtures containing steam.

Typically in steam cracking, a hydrocarbon feedstock such as naphtha, gas oil, or other non-resid containing fractions of whole crude oil, which may be obtained, for instance, by distilling or otherwise fractionating whole crude oil, is usually mixed with steam and introduced to a steam cracker. Conventional steam cracking utilizes a pyrolysis furnace that generally has two main sections: a convection section and a radiant section. In the conventional pyrolysis furnace, the hydrocarbon feedstock enters the less severe convection section of the furnace as a liquid (except for light feedstocks which enter as a vapor) wherein it is heated and vaporized by indirect contact with hot flue gas from the radiant section and optionally by direct contact with steam. The vaporized feedstock (and optional steam) mixture is then conveyed (typically through crossover piping) into the radiant section where it is quickly heated, at pressures typically ranging from about 10 to about 50 psig (69 to 345 kPa), to a severe hydrocarbon cracking temperature, such as in the range of from about 1450° F. (788° C.) to about 1650° F. (900° C.), to provide thorough thermal cracking of the feedstream. The resulting products, comprising olefins, leave the pyrolysis furnace for rapid quenching and further downstream separation and processing.

After cracking, the effluent from the pyrolysis furnace contains gaseous hydrocarbons of great variety, e.g., saturated, monounsaturated, and polyunsaturated, and can be aliphatic and/or aromatic, as well as significant amounts of molecular hydrogen ($H_2$). The cracked product is then further processed such as in the olefin production plant to produce, as products of the plant, the various separate individual streams of high purity, i.e., hydrogen, the light olefins ethylene, propylene, butylenes, and aromatic compounds, as well as other products such as pyrolysis gasoline and pyrolysis gas oils.

As worldwide demand for light olefins increases and the availability of favorable crude sources is depleted, it becomes necessary to utilize heavier crudes (i.e., those having higher proportions of resid), which requires increased capital investments to process and handle the refining byproducts. It is highly desirable to have processes that can take lower cost, heavier crudes, and produce a higher value product mix of light olefins, more efficiently. However, conventional steam cracking processes are known to be severely limited by fouling when using feedstocks containing high concentrations of resid, which is commonly present in low quality, heavy feeds. Thus, most steam cracking furnaces are limited to processing of higher quality feedstocks which have had substantially all of the resid fraction removed in other refinery processes. Such additional processes increase the cost of the overall process. Likewise, removal of the resid fraction lowers the overall conversion efficiency of the refinery process, since most of the resid fraction is mixed with low value fuel oils, rather than being converted to higher-value materials.

Cracking of heavy hydrocarbon feeds in fluidized cokers has been described in U.S. Pat. No. 3,671,424, incorporated herein by reference, which discloses a two-stage fluid coking process in which the first stage is a transfer line for short contact time and the second is either a transfer line or a fluidized bed.

U.S. Patent Published Patent Application No. 2007/0090018, incorporated herein by reference, discloses integration of hydroprocessing and steam cracking. A feed comprising crude or resid-containing fraction thereof is severely hydrotreated and passed to a steam cracker to obtain an olefins product.

U.S. Pat. No. 4,975,181, incorporated herein by reference, discloses an improved process and apparatus for the pyrolysis of a heavy hydrocarbon feed utilizing a transfer line reactor wherein pyrolysis reaction temperatures are achieved by contact of the heavy hydrocarbon feed with heated solid particles immediately followed by quenching of the pyrolysis gaseous effluent with cooled solid-particles in the transfer line reactor to maximize ethylene production and minimize the effect of secondary reactions.

Other patents of interest related to cracking heavy feeds include U.S. Pat. No. 4,257,871; U.S. Pat. No. 4,065,379; U.S. Pat. No. 4,180,453; U.S. Pat. No. 4,210,520; U.S. Pat. No. 7,097,758; U.S. Pat. No. 7,138,097; U.S. Pat. No. 7,193,123; U.S. Pat. No. 3,487,006; U.S. Pat. No. 3,617,493; U.S. Pat. No. 4,065,379; U.S. Pat. No. 3,898,299; U.S. Pat. No. 5,024,751; U.S. Pat. No. 5,413,702; U.S. Pat. No. 6,210,561; U.S. Pat. No. 7,220,887; U.S. Pat. No. 3,617,493; US 2007/023845; WO 01/66672; WO 2007/117920; U.S. Pat. No. 6,632,351; WO 2009/025640; and WO 2007/117919. Other references of interest include: "Tutorial: Delayed Coking Fundamentals." P. J. Ellis and C. A. Paul, paper 29a, Topical Conference on Refinery Processing, 1998 Great Lakes Carbon Corporation (which can be downloaded from http://www.coking.com/DECOKTUT.pdf).

There remains in the art a need for new means and processes for economical processing of heavy, resid-containing feeds for the production of olefins, aromatics, and other valuable petrochemical products. All known art previous to this invention, has deficiencies, shortcomings, or undesirable aspects.

SUMMARY OF THE INVENTION

In one embodiment, the present invention is directed to a process, preferably a continuous process, for cracking a hydrocarbon feed containing resid, comprising: heating a hydrocarbon feedstock containing resid; passing said heated hydrocarbon feedstock to a vapor/liquid separator (such as a knock-out drum); flashing said heated hydrocarbon feedstock in said vapor/liquid separator to form a vapor phase (such as an overhead vapor phase) and a liquid phase containing said resid; passing at least a portion of said resid-containing liquid phase from said vapor/liquid separator to a thermal conversion reactor containing coke particles, (preferably the thermal conversion reactor is operating at 1200° F. (649° C.) or more); and converting at least a portion of said resid into olefins. Preferably the coke particles are present in the reactor at a coke particle/fresh feed ratio (wt/wt) of at least 1:1, based on the weight of circulating coke solids and fresh feed entering the reactor. (When a reactor or reaction zone is stated to be "operating at" a certain temperature it means that material in the reactor or zone has been heated to that temperature.) If the resid thermal conversion reactor is operated in a riser configuration, the solids circulation is preferably adjusted to provide a hot coke/fresh resid feed ratio (wt/wt) in the contacting zone of at least 3:1, preferably above 5:1, and preferably above 8:1, preferably up to about 30:1 preferably with short contacting times on the order of seconds (typically 0.5 to 30 seconds, preferably 1 to 10 seconds, preferably 1.5 to 5 seconds). If the thermal conversion unit is operating as a dense fluid bed, this ratio could be similar or somewhat lower (such as 0.1:1 to 30:1) and include longer contacting times in the range of 10-20 seconds or more (such as 10 to 60 seconds).

In another embodiment of the process, the thermal conversion reactor is a transfer line reactor integrated with a fluidized coker, and the process further comprises combining said resid-containing liquid bottoms phase with coke particles extracted from said fluidized coker to form a fluidized mixture within said transfer line reactor.

In another embodiment, the process further comprises separating said coke particles from said olefins exiting said transfer line reactor with at least one cyclone separator and passing said coke particles into a steam-air gasifier incorporated within said fluidized coker.

In another embodiment, the process comprises mixing said resid containing liquid bottoms phase with an effluent from a fluidized catalytic cracking (FCC) reactor containing FCC catalyst fines, prior to passing said liquid phase to said transfer line reactor.

Advantageously, the process further comprises recycling said FCC catalyst fines and said coke particles between said transfer line reactor and said fluidized coker, such that the concentration of FCC catalyst fines achieves a steady state level between 5 wt % and 25 wt % of the circulating solids.

Conveniently, the hydrocarbon feedstock is heated in a convection section of a steam cracking furnace, and said vapor/liquid separator (such as a knock-out drum) is integrated with said steam cracking furnace.

Advantageously, said hydrocarbon feedstock contains at least 1 wt % resid, preferably at least 10 wt % resid, preferably at least 20 wt % resid, typically between 10 wt % and 50 wt % of resid. Preferably the hydrocarbon feedstock contains at least 1 wt % 566° C.+ resid, preferably at least 10 wt % 566° C.+ resid, preferably at least 20 wt % 566° C.+ resid, typically between 10 wt % and 50 wt % of 566° C.+ resid.

Conveniently, said olefins are combined with a product stream from a steam cracking furnace.

Preferably, the temperature within the thermal conversion reactor is from 649° C. to 1000° C., preferably from 700° C. to 900° C., typically from 700° C. to 800° C.

The present invention is also directed to a system, preferably continuous, for cracking hydrocarbon feedstock containing resid comprising: a steam cracking furnace having a vapor/liquid separator (such as a knock-out drum) integrated with a convection section of said furnace; and a fluidized coker comprising: a fluidized bed gasifier, a transfer line reactor comprising a hydrocarbon feed inlet in fluid communication with a lower portion of said knock-out drum, and a pyrolysis product outlet line, a solids conduit connecting a lower portion of said fluidized bed gasifier with said transfer line reactor, and at least one cyclone separator having an inlet connected to said pyrolysis product outlet line, a cracked product outlet at a top portion of said cyclone separator, and a solids outlet at the bottom of said cyclone separator.

Advantageously, the system further comprises an air/steam inlet at the bottom of said fluidized bed gasifier.

In another embodiment, the fluidized bed coker further comprises a fluidized bed heater vessel, having recirculating solids conduits, preferably two solids conduits, connecting lower portions of said heater vessel and said gasifier, and at least one gas conduit connected between an upper portion of said gasifier and the lower portion of said heater vessel.

Advantageously, the cyclone separator solids outlet is connected to either or both of said fluidized bed gasifier or said heater vessel.

In one embodiment, the transfer line reactor is a vertical riser reactor, wherein said solids conduit and said hydrocarbon feed inlet are connected to a lower portion of said reactor.

In another embodiment, the transfer line reactor is a down-flow reactor, wherein said solids conduit and said hydrocarbon feed inlet are connected to an upper portion of said reactor.

In another embodiment, $C_2$-$C_4$ hydrocarbons are produced in the thermal conversion reactor and said $C_2$-$C_4$ hydrocarbons are further converted by recycling to a steam cracking furnace.

In another embodiment, any process described here is a continuous process. By continuous is meant that the process operates without cessation or interruption. For example, a continuous process to produce olefins would be one where the reactants are continually introduced into one or more reactors and olefin product is continually withdrawn.

These and other objects, features, and advantages will become apparent as reference is made to the following detailed description, preferred embodiments, examples, and appended claims.

BRIEF DESCRIPTION OF THE DRAWINGS

In the Figures below, similar apparatuses and/or process steps are identified with like numbers.

DETAILED DESCRIPTION OF THE INVENTION

Figure 1:
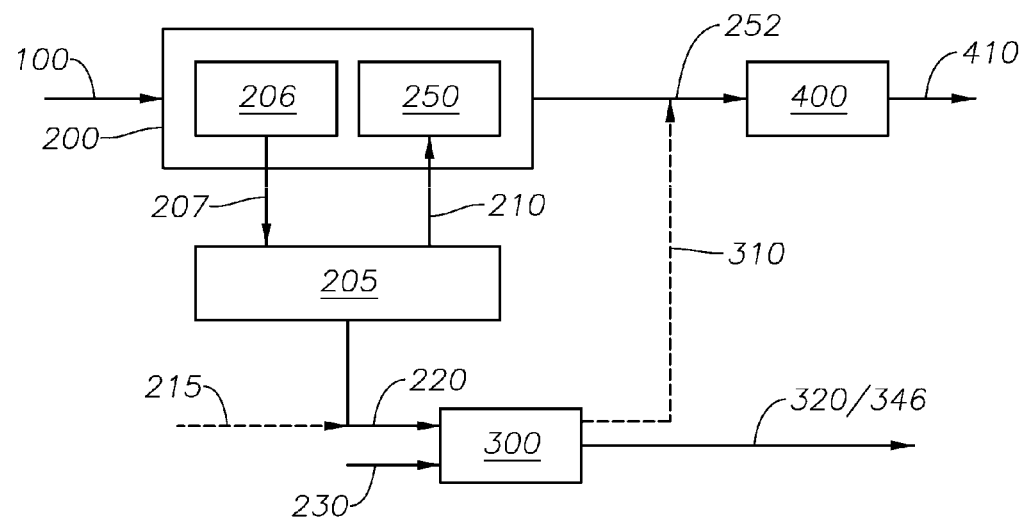
FIG. 1 is a flow diagram of an embodiment of the present invention process.

This invention discloses methods, preferably continuous methods, for producing chemicals, (such as olefins and or other cracked components such as lighter hydrocarbons) from heavy feedstocks in a manner where a high fraction of vacuum resid is more efficiently converted to chemicals (such as olefins and or other cracked components such as lighter hydrocarbons). The invention involves combination of a steam cracker having an integrated knock-out drum with a high temperature fluid coker or Flexicoker™.

The fluid coking and Flexicoking™ processes were developed by Exxon in the 1960s and are described in detail in a wide range of previous patents as well as textbooks on resid processing technologies. For example, U.S. Pat. No. 3,671,424, incorporated herein by reference, describes and illustrates a suitable fluidized coking apparatus and process for use herein.

In an embodiment of the present invention, the resid-containing effluent from a knock-out drum, such as a knock-out drum which is integrated with the convection section of a steam cracking furnace, is withdrawn as a bottoms stream, passed to a thermal conversion reactor, such as a fluidized coker, cracked and converted to desired products including olefins, which can be combined with a product stream exiting the radiant section of one or more steam crackers. The terms thermal pyrolysis unit, pyrolysis unit, steam cracker, and steamcracker are used synonymously herein; all refer to what is conventionally known as a steam cracker, even though the use of steam is optional.

According to the invention, a crude oil or fraction thereof containing resid is utilized as a feedstock for a steam cracking furnace. Suitable lower value feeds may typically include heavier crudes, those hydrocarbon feedstocks that have high concentrations of resid, high sulfur, high Total Acid Number (TAN), high aromatics, and/or low hydrogen content.

Crude, as used herein, means whole crude oil as it issues from a wellhead, production field facility, transportation facility, or other initial field processing facility, optionally including crude that has been processed by a step of desalting, treating, and/or other steps as may be necessary to render it acceptable for conventional distillation in a refinery. Crude as used herein is presumed to contain resid.

Crude fractions are typically obtained from the refinery pipestill. Although any crude fraction obtained from the refinery pipestill may be useful in the present invention, a significant advantage offered by the present invention is that crude or crude fractions still containing all or a portion of the original resid present in the whole crude obtained from the wellhead may be used as feed for a steam cracker. In one embodiment, the crude or other feedstock to the present system may comprise at least about 1 wt % resid, preferably at least about 5 wt % resid, and more preferably at least about 10 wt % resid up to about 50 wt % resid, preferably at least about 1 wt % 566° C.$^+$ resid, preferably at least about 5 wt % 566° C.$^+$ resid, and more preferably at least about 10 wt % 566° C.$^+$ resid up to about 50 wt % 566° C.$^+$ resid.

Resid as used herein refers to the complex mixture of heavy petroleum compounds otherwise known in the art as residuum or residual. Atmospheric resid is the bottoms product produced in atmospheric distillation where the endpoint of the heaviest distilled product is nominally 650° F. (343° C.), and is referred to as 650° F.$^+$ (343° C.$^+$ resid. Vacuum resid is the bottoms product from a column under vacuum where the heaviest distilled product is nominally 1050° F. (566° C.), and is referred to as 1050° F.$^+$ (566° C.$^+$) resid. (The term "nominally" means here that reasonable experts may disagree on the exact cut point for these terms, but probably by no more than +/−50° F. or at most +/−100° F.) This 1050° F.$^+$ (566° C.$^+$) portion contains asphaltenes, which traditionally are considered to be problematic for the steam cracker, resulting in severe fouling and potentially corrosion or erosion of the apparatus. The term "resid" as used herein means the 650° F.$^+$ (343° C.$^+$) resid and 1050° F.$^+$ (566° C.$^+$) resid unless otherwise specified (note that 650° F.$^+$ resid comprises 1050° F.$^+$ resid). According to this invention, at least a portion of the 650° F.$^+$ resid, up to at least the 1050° F.$^+$ (566° C.$^+$) boiling point fraction, is vaporized, such as when combined with steam, and/or when the pressure is reduced or flashed in the knock-out drum of the steam cracker.

Resid typically contains a high proportion of undesirable impurities such as metals, sulfur and nitrogen, as well as high molecular weight ($C_{12}^+$) naphthenic acids (measured in terms of TAN according to ASTM D-664, TAN refers to a total acid number expressed as milligrams ("mg") of KOH per gram ("g") of sample). Yet another advantage of the present invention is that feeds high in one or more of these impurities may be readily processed. In some embodiments, this invention can be practiced on 566° C.$^+$ resid having: one or more (preferably two, three, four, five, six or seven) of the following properties: 1) 50 ppm of Ni or more, alternately 100 ppm or more, alternately 125 ppm or more, based upon the weight of the 566° C.$^+$ resid; and/or 2) 200 ppm vanadium or more, alternately 500 ppm or more, alternately 900 ppm or more, based upon the weight of the 566° C.$^+$ resid; and/or 3) 4 wt % sulfur or more, alternately 5 wt % or more, alternately 6 wt % or more, based upon the weight of the 566° C.$^+$ resid; and/or 4) a TAN of at least 0.1, alternately at least 0.3, alternately from about 0.1 to about 20, about 0.3 to about 10, or about 0.4 to about 5; and/or 5) an API gravity of 19 or less (ASTM D6822, 15.5° C.); and/or 6) a $C_5$ asphaltenes content of at least 0.04 grams of $C_5$ asphaltenes per gram of resid ("$C_5$ asphaltenes" refers to asphaltenes that are insoluble in pentane as determined by ASTM Method D2007); and/or 7) a kinematic viscosity at 37.8° C. of at least 10 cSt (as determined by ASTM D445). Examples resids that can be used herein are the 566° C.$^+$ resids obtained from crudes including, but not limited to, crudes from of the following regions of the world: U.S. Gulf Coast, southern California, north slope of Alaska, Canada tar sands, Canadian Alberta region, Mexico Bay of Campeche, Argentinean San Jorge basin, Brazilian Santos and Campos basins, Egyptian Gulf of Suez, Chad, United Kingdom North Sea, Angola Offshore, China Bohai Bay, China Karamay, Iraq Zagros, Kazakhstan Caspian, Nigeria Offshore, Madagascar northwest, Oman, Netherlands Schoonebek, Venezuelan Zulia, Malaysia, and Indonesia Sumatra. Additional resids useful herein include 566° C.$^+$ resids obtained from crude oils described as "disadvantaged" in U.S. Pat. No. 7,678,264, incorporated by reference herein.

In a preferred embodiment, wherein the feed comprises crude or atmospheric resid that contain appreciable amounts of 1050° F.$^+$ (566° C.$^+$) resids, e.g., 10 wt % or more of resid, or 20 wt % or more of resid, or even 50 wt % or more of resid, the resid-containing feed may be passed into the convection section of a pyrolysis unit, where it is heated. Then the heated feed may be passed to a pressure reduction device or flash separation drum, which is integrated with the pyrolysis furnace, to drop out the heaviest fraction (e.g., substantially the asphaltenes). The terms "flash drum", "flash pot", "knock-out drum" and knock-out pot" are used interchangeably herein; they are known in the art, meaning generally, a vessel or system to separate a liquid phase from a vapor phase. The term "flash" means generally to effect a phase change for at least a portion of the material in the vessel from liquid to vapor, via a reduction in pressure and/or an increase in temperature. An integrated knock out drum is a vapor/liquid separator that is in fluid communication with a steam cracker. Specifically, the integrated knock-out drum is in fluid communication with the convection section of a steam cracker, where feedstock is heated (optionally mixed with superheated steam) and transferred to said knock-out drum operating as a vapor/liquid separator, thereafter the vapors from the knock-out drum are returned to the steam cracker, preferably either to the convection or radiant section, or both. The addition of steam may further assist flash separation by reducing the hydrocarbon partial pressure, assist in conversion and vaporization of the 750° F.$^+$ (399° C.$^+$) to 1050° F.$^+$ (566° C.$^+$) (preferably even a substantial portion of the 1100° F.$^+$ (593° C.$^+$)) resid fractions, and prevent fouling.

Preferred flash drums or vapor/liquid separation devices, and their integration with pyrolysis units have previously been described in U.S. Pat. Nos. 7,090,765, 7,097,758, and 7,138,097, which are incorporated herein by reference. Another apparatus effective as a flash drum for purposes of the present invention is described in U.S. Pat. No. 6,632,351 as a "vapor/liquid separator".

The vapor/liquid separator operates at a temperature and pressure where those portions of the feed material that cause coking are kept in a liquid state, preferably the vapor/liquid separator operates at a temperature of between about 375 to 525° C., preferably from 400 to 500° C., preferably from 800° F. (about 425° C.) and about 870° F. (about 465° C.), but also typically not over about 900° F. (about 482° C.). Flashing material through the flash drum to obtain an overhead vapor and liquid bottoms further facilitates vaporization of a major fraction of the 650° F.$^+$ (343° C.$^+$) to 1050° F.$^+$ (566° C.$^+$) fraction of the resids.

A steam cracking furnace (also referred to as a "steam cracker") is a pyrolysis furnace that has two main sections: a convection section and a radiant section, where hydrocarbon feedstock enters the less severe convection section of the furnace as a liquid (except for light feedstocks which enter as a vapor) and where the feedstock is heated and vaporized by indirect contact with hot flue gas from the radiant section and optionally by direct contact with steam. The vaporized feedstock and steam mixture (if present) is then introduced (typically through crossover piping) into the radiant section where it is quickly heated, at pressures typically ranging from about 10 to about 50 psig (69 to 345 kPa), to a severe hydrocarbon cracking temperature, such as in the range of from about 1450° F. (788° C.) to about 1650° F. (900° C.), to provide thorough thermal cracking of the feedstream. The resulting products typically comprise olefins.

Steam cracking alone provides for a product comprising significant yields of fuel oil, tar, and non-aromatic SCN (steam cracked naphtha) in addition to the desired ethylene, propylene, butylenes, $C_5$ olefins, dienes, and single-ring aromatic products. However, in a process according to the present invention, steam cracking conducted simultaneously and in parallel with another high temperature thermal conversion reactor, such as a coker, reduces the yields of fuel oil, while increasing the yield of the aforementioned desirable petrochemical products. By separating a resid-containing bottoms liquid in the vapor/liquid separator, and then cracking the resid in a fluidized coker, further improvement in the conversion of resid components to vaporized chemical precursors, such as light olefins and other more valuable light products can be achieved.

The fluid coker preferably includes an integrated air gasifier (or partial oxidation reactor) which is used to convert coke to fuel gas by steam/air gasification and combustion at between about 1400-1800° F. (760-982° C.). This gasification can be facilitated by cofeeding oxygen or by using oxygen enriched air. Hot, partially gasified coke from this gasification reaction is continuously withdrawn from the gasifier and fed to one or more solids transfer lines where it is contacted with the bottoms material recovered from one or more steam cracking furnaces equipped with integrated vapor/liquid separators (such as knock-out drums). This residual oil fraction is converted at 1300-1800° F. (704-982° C.) to a mixture of lighter hydrocarbons containing high concentrations of ethylene and propylene. While the transfer line reactors can be configured in several ways, a preferred configuration is similar to that used in fluid catalytic cracking units; e.g., the transfer line is operated as a vertical riser reactor where the hot solids are contacted with feed near the bottom of the riser, the solids and vapor are transported upward along the riser, and the solids and vapor are separated using one or more cyclones in series. Alternatively, the transfer line can be operated as "downer" or downflow reactor. Irrespective of the specific configuration, the transfer line reactor is highly effective for contacting hot coke with the residual oil. The hot coke provides the heat needed to fully convert the residual oil feed to lighter hydrocarbons in short reaction times of about 0.1-10 seconds, preferably about 1 second, and to coke which is deposited on previously formed coke particles.

Alternately, the thermal conversion reactor, preferably a transfer line reactor, contains at least 0.1 wt % coke particles, based upon the weight of the circulating solids in the thermal conversion reactor, preferably 1 to 30 wt %, preferably from 3 to 25 wt %, preferably from 5 to 25 wt %.

A primary feature of the present invention is the direct use of hot gasifier coke as a heat transfer medium for high temperature coking of residual oil for producing chemicals. This embodiment differs substantially from prior art related to the fluid coking processes. The inventors have unexpectedly discovered that high temperature coking is effective for producing chemicals (such as olefins and or other cracked components such as lighter hydrocarbons), especially when integrated with a steam cracker equipped with integrated vapor/liquid separators (such as knock-out drums).

In the figures and description below, reference to a knock-out drum may be taken to generally refer to any vapor/liquid separator device.

The basic flow scheme is illustrated in FIG. 1. A heavy feedstock 100 containing 1 wt % or more (typically about 10-50 wt %) molecules boiling in the vacuum resid range (566° C.$^+$) is fed to a first steam cracking furnace 200 which includes an integrated knock-out drum 205. The whole feed is heated to about 400-470° C. in the convection section 206 of the furnace. The whole feed passes through line 207 into the knock-out drum separation device 205 where molecules boiling below about 538-593° C. are vaporized (or remain vaporized) and are separated from heavier compounds which remain in the liquid phase (pressure reduction and/or steam stripping, among other things, in the drum can be used to cause additional molecules to vaporize). Material typically enters the drum at a temperature of about 400-470° C. and vaporization is facilitated by the use of steam stripping or stripping with light hydrocarbons. The vapors pass through line 210 into the radiant section 250 of the first steam cracking furnace 200 (either directly or via a heater, such a transfer line heater or a convection section of the steam cracker), whereas the heavy liquids are withdrawn from the bottom of the knock-out drum through line 220.

This material that is removed from the bottom of the knock-out drum then serves as the primary feedstock for the high temperature coking apparatus 300. Heavy liquids from several knock-out drum equipped furnaces are preferably combined to achieve better economy of scale in the high temperature fluid coker process. If the unit is located in a large refinery complex, it is possible to combine supplemental residual oil feedstock 230 from the refinery with that recovered from the knock-out drums. Another potential feedstock from the steam cracker is the heavy fractions (or steam cracked tar) produced from steam cracking of gas oil fractions.

In another preferred embodiment, products from the steam cracking reaction 252 are combined with hydrocarbon products from the high temperature coking reaction 310 before separation into a series of fuel and chemical products such as olefins and or other cracked components such as lighter hydrocarbons). In this manner, better energy efficiency and economy of scale is achieved in the separation process. This can be accomplished by cooling the vapors from the steam cracking and coking reactions by contacting with quench oils and/or use of heat exchangers. The cooled vapors and any condensed liquids are fed to a common primary fractionator 400 where the wide-cut product is separated into several major product streams 410 such as $C_4^-$ hydrocarbons, $C_5$-$C_{10}$ naphtha, $C_{10}$-$C_{20}$ distillates, and heavier gas oils. ($C_4^-$ hydrocarbons are gases with weights at or below $C_4$, including methane, ethane, ethylene, propylene, propane, butenes, butanes, hydrogen, and the like.) These major product streams are then further separated and purified using typical methods for the refining and chemicals industry such as fractionation and hydroprocessing. Fuel gas (CO, $CO_2$ and $H_2$) created during the high temperature coking process is withdrawn from the coker 300 via line 320 and/or 346 for use elsewhere in the process, described below. One of the important advantages of the integrated coking and steam cracking configuration is that light paraffins, such as ethane and propane that are produced in the coking reaction, can be easily recycled to one of the steam cracking furnaces for conversion to ethylene and propylene.

In a preferred embodiment, the residual oil feedstock to the high temperature coking reactor is mixed with minor amounts of heavy cycle oil (HCCO) 215 from a fluid cat cracking (FCC) process. The heavy cycle oil normally boils in the range of about 454 to 593° C. and normally contains small levels (0.01 to 2-3 wt %) of FCC catalyst fines. These fines are produced by attrition of FCC catalyst particles during the FCC process. By adding a small amount of HCCO containing FCC catalyst fines to the high temperature coking process, it is possible to introduce a modest level of catalytic boost to the resid coking process which is effective for increasing the yield of propylene in the product mixture from high temperature coking. Because the high temperature coker operates in a cyclic manner, described in more detail below, where the coke particles are circulated between the gasifier, heater, and reactor, multiple passes are required before the coke particles are fully converted or otherwise removed as purge. Therefore, it is possible to build a moderately high concentration (5-25 wt %) of catalyst fines into the circulating solids inventory.

Figure 2:
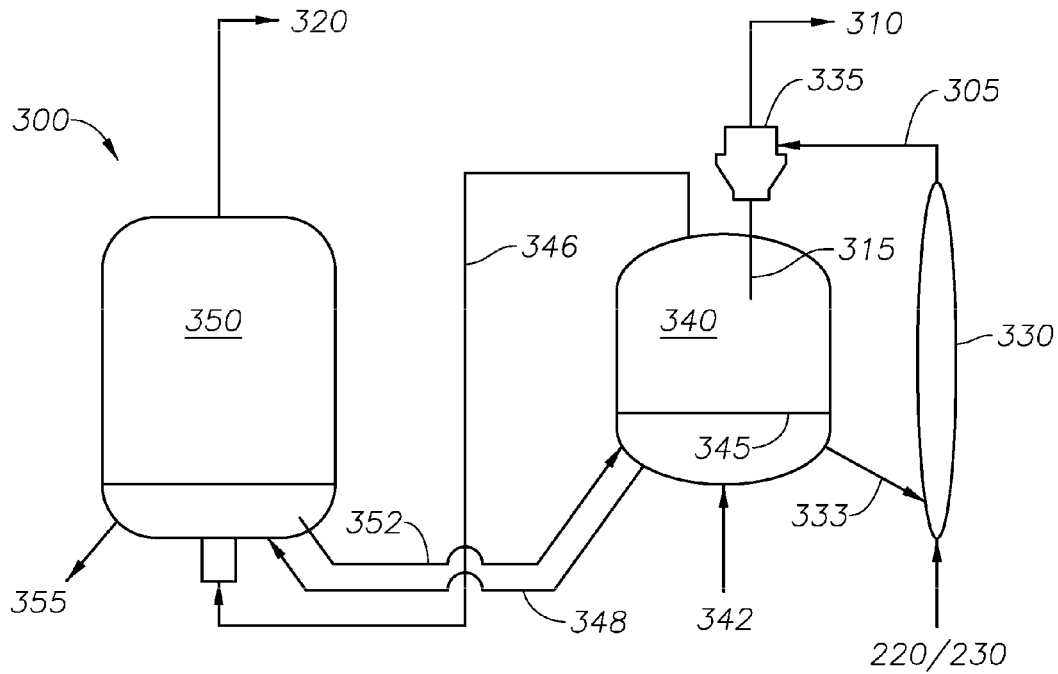
FIG. 2 is a diagram of a thermal conversion reactor useful in the present process.

FIG. 2 provides a simplified diagram to further illustrate the process and apparatus for high temperature coking. The fluidized coker 300 includes an air gasifier 340 which operates as a dense phase fluidized bed reactor at about 871-1037° C., preferably about 954° C. Air and steam 342 are fed to the gasifier using a series of distributors or nozzles which are incorporated in a grid plate 345 within the gasifier. The reaction of air and steam with the coker particles converts part of the coke to a mixture of gases primarily including CO, $CO_2$, $H_2$ (fuel gas). The coke partial oxidation reaction which occurs in the gasifier is exothermic and produces the heat needed to drive the endothermic coking reaction. Energy balance is achieved by balancing the rates at which air and steam are fed to the gasifier with the rate of coke removal through solids line 333 for use in the coking reaction, the feed rate to the coker, and coke withdrawal to the "heater" vessel 350 through line 348, and processing temperatures within the different sections of the unit. Slide valves or other means can be used to adjust the solids circulation rates and pressure balance within the system.

Residual oil from the steam cracker integrated knock-out drum and/or other refinery resid-containing feed 220/230 is fed to one or more transfer line reactors 330 which are supplied with hot circulating coke from the air gasifier 340 through line 333. The heavy oil is converted in the transfer line reactor (such as a riser or standpipe), exits through line 305, and the cracked vapors 310 are separated from the solids using cyclones 335 (or other separation devices) and optionally stripping with steam or other process gas. In addition to cracked products, the coking reaction converts part of the feedstock (typically 15-40%) to new coke deposits on the coke particles. As shown, coke is removed from the cracked gas and returned to the gasifier 340 through line 315, where it is further converted by air gasification. Alternatively, in another embodiment (not shown), it may be preferred to disengage the cracked vapor from the solid coke particles above the heater vessel 350, rather than to disengage the coke particles back into the gasifier. The decision whether to disengage coke into the heater or the gasifier is determined by the specific unit design, the gasifier operating pressure, and operating features such as the feed quality or crackability. Both approaches are fully feasible and fall within the overall scope of the invention. In both approaches it will be advantageous to steam strip the coke to increase recovery of cracked products.

Product gas 346 from the gasifier is removed overhead from the gasifier 340 directly or more typically by routing to the heater for partial cooling and collection overhead using internal cyclones and suitable piping. The processing unit includes at least another fluidized bed labeled as the heater 350. This vessel can have several functions with the primary role to partially cool the gasifier product gases (as noted above) and moderate and maintain overall heat balance and solids circulation. Hot solid coke particles are circulated between the gasifier 340 and the heater 350 using solids transfer lines 348 and 352.

The heater is maintained at a much lower average bed temperature as compared to the gasifier, typically 315-537° C. Hot product fuel gas 346 from the gasifier 340 is routed to the heater 350 where it is cooled to approximately the heater operating temperature. This gas and optionally steam are used to fluidize the coke within the heater 350. The cooled fuel gas 320 has medium BTU content and can be subsequently used as fuel for furnaces or power generating equipment within the refinery or chemical plant. It is also possible to use the heater for preheating the residual oil feed to the coking reaction. This can be accomplished using heat exchangers within the vessel (not shown). Likewise, it is also possible to remove part of the coke from the heater as a purge stream 355. This is particularly useful to improve operating efficiency when the feed to the coking reaction has higher metal or mineral content.

While this second vessel can be helpful in improving unit energy efficiency and operability, it is also possible to design a unit with a single vessel so as to reduce investment and operating complexity. One of the major advantages of the fluid coking process for producing chemicals from heavy residual oils is the ability to utilize lower quality feeds which may contain metals or other forms of mineral matter with a high degree of flexibility. Other known processes, such as high temperature catalytic cracking or catalytic pyrolysis are not able to effectively utilize such feeds.

Those skilled in the art of heavy feed processing are familiar with the difficulties of operating heavy feed steam cracking and coking processes without fouling. It is not obvious how to integrate the processes without further aggravating these phenomena. The integrated knock-out drum is particularly efficient and effective in this regard, as it allows cut points between the vapor and heavy liquids to be easily varied consistent with the properties of the feedstock.

In another embodiment, this invention relates to:
1. A process for cracking a hydrocarbon feed containing resid, comprising:
(a) heating a hydrocarbon feedstock containing resid;
(b) passing said heated hydrocarbon feedstock to a vapor/liquid separator (such as a knock-out drum);

(c) flashing said heated hydrocarbon feedstock in said separator to form a vapor phase (typically an overhead vapor phase) and a liquid phase (such as a liquid bottoms phase) containing said resid;

(d) passing at least a portion of said resid-containing liquid bottoms phase from said separator to a thermal conversion reactor where the resid-containing liquid bottoms phase is heated to 649° C. or more, wherein said thermal conversion reactor contains coke particles, said reactor having a coke particle/fresh feed ratio (wt/wt) of at least 1:1 (preferably at least 3:1, preferably at least 5:1, alternately from 1:1 to 50:1, preferably from 3:1 to 30:1), based on the weight of circulating coke solids and fresh feed entering the reactor; and (e) converting at least a portion of said resid into olefins.

2. The process of paragraph 1, wherein said thermal conversion reactor is a transfer line reactor and the coke particle/fresh feed ratio (wt/wt) in the transfer line reactor is in the range of about 3:1 to about 30:1.

3. The process of paragraph 1 or 2, wherein said thermal conversion reactor is a transfer line reactor in fluid communication with a fluidized coker, and further comprising combining said resid-containing liquid phase with coke particles extracted from said fluidized coker to form a fluidized mixture within said transfer line reactor.

4. The process of paragraph 1, 2 or 3, further comprising separating said coke particles from said olefins exiting said transfer line reactor, preferably with at least one cyclone separator, and passing said coke particles into a steam-air gasifier incorporated within said fluidized coker.

5. The process of any of paragraphs 1 to 4, further comprising mixing said resid-containing liquid phase with an effluent from a fluidized catalytic cracking (FCC) reactor containing FCC catalyst fines, prior to passing said liquid phase to said transfer line reactor.

6. The process of paragraph 5, further comprising recycling said FCC catalyst fines and said coke particles between said transfer line reactor and said fluidized coker, such that the concentration of FCC catalyst fines achieves a steady state level between 5 wt % and 25 wt % of the circulating solids.

7. The process of any of paragraphs 1 to 6, wherein said hydrocarbon feedstock is heated in a convection section of a steam cracking furnace, and said separator is in fluid communication (e.g., integrated) with said steam cracking furnace.

8. The process of any of paragraphs 1 to 7, wherein said hydrocarbon feedstock contains between 10 wt % and 50 wt % of 566° C.$^+$ resid.

9. The process of any of paragraphs 1 to 8, wherein the temperature within the thermal conversion reactor is from 600 to 900° C., alternately 700 to 800° C.

10. A system for cracking hydrocarbon feedstock containing resid comprising:

(a) a steam cracking furnace having a vapor/liquid separator (e.g., a knock-out drum) in fluid communication (e.g., integrated) with said furnace (typically the convection section of said furnace); and (b) a fluidized coker comprising:
i) a fluidized bed gasifier,
ii) a transfer line reactor comprising a hydrocarbon feed inlet in fluid communication with a lower portion of said separator, and a pyrolysis product outlet line,
iii) a solids conduit connecting a lower portion of said fluidized bed gasifier with said transfer line reactor, and
iv) at least one cyclone separator having an inlet connected to said pyrolysis product outlet line, a cracked product outlet at a top portion of said cyclone separator, and a solids outlet at the bottom of said cyclone separator.

11. The system of paragraph 10, further comprising an air/steam inlet at the bottom of said fluidized bed gasifier.

12. The system of paragraph 10 or 11, wherein said fluidized coker further comprises a fluidized bed heater vessel, having recirculating solids conduits connecting lower portions of said heater vessel and said gasifier, and at least one gas conduit connected between an upper portion of said gasifier and the lower portion of said heater vessel.

13. The system of any of paragraphs 10 to 12, wherein said cyclone separator solids outlet is connected to either or both of said fluidized bed gasifier or said heater vessel.

14. The system of any of paragraphs 10 to 13, comprising two solids conduits connecting lower portions of said heater vessel and said gasifier.

15. The system of any of paragraphs 10 to 14, wherein said transfer line reactor is a vertical riser reactor, wherein said solids conduit and said hydrocarbon feed inlet are connected to a lower portion of said reactor.

16. The system of any of paragraphs 10 to 15, wherein said transfer line reactor is a downflow reactor wherein said solids conduit and said hydrocarbon feed inlet are connected to an upper portion of said reactor.

17. The process of any of paragraphs 1 to 8, wherein said olefins are combined with a product stream from a steam cracking furnace.

18. The process of any of paragraphs 1 to 8 or 17, wherein $C_2$-$C_4$ hydrocarbons are produced in the thermal conversion reactor and said $C_2$-$C_4$ hydrocarbons are further converted by recycling to a steam cracking furnace.

19. The system of any of paragraphs 10 to 15, wherein $C_2$-$C_4$ hydrocarbons are produced in the fluidized coker and said $C_2$-$C_4$ hydrocarbons are further converted by recycling to the steam cracking furnace.

20. The process of any of paragraphs 1 to 8, 17 or 18, wherein oxygen or oxygen-enriched air is introduced into the steam-air gasifier.

21. The system of any of paragraphs 10 to 15, or 19, wherein oxygen or oxygen-enriched air is introduced into the fluidized bed gasifier.

22. The process of any of paragraphs 1 to 8, 17, 18 or 20, where the coke particles are entrained in the fluid in the reactor.

23. The process or system of any of the above paragraphs 1 to 21, wherein the resid is a 566° C.$^+$ resid obtained from crudes from one or more of the following regions of the world: U.S. Gulf Coast, southern California, north slope of Alaska, Canada tar sands, Canadian Alberta region, Mexico Bay of Campeche, Argentinean San Jorge basin, Brazilian Santos and Campos basins, Egyptian Gulf of Suez, Chad, United Kingdom North Sea, Angola Offshore, China Bohai Bay, China Karamay, Iraq Zagros, Kazakhstan Caspian, Nigeria Offshore, Madagascar northwest, Oman, Netherlands Schoonebek, Venezuelan Zulia, Malaysia, and Indonesia Sumatra.

Unless otherwise specified, the meanings of terms used herein shall take their ordinary meaning in the art; reference shall be taken, in particular, to Handbook of Petroleum Refining Processes, Third Edition, Robert A. Meyers, Editor, McGraw-Hill (2004). In addition, all priority documents, patents and patent applications, test procedures (such as ASTM methods), and other documents cited herein are fully incorporated by reference to the extent such disclosure is not inconsistent with this invention and for all jurisdictions in which such incorporation is permitted. Also, when numerical lower limits and numerical upper limits are listed herein, ranges from any lower limit to any upper limit are contemplated.

The invention has been described above with reference to numerous embodiments and specific examples. Many variations will suggest themselves to those skilled in this art in light of the above detailed description. All such obvious variations are within the full intended scope of the appended claims.

What is claimed is:

1. A process for cracking a hydrocarbon feed containing resid, comprising:
   (a) heating a hydrocarbon feedstock containing resid;
   (b) passing said heated hydrocarbon feedstock to a vapor/liquid separator;
   (c) flashing said heated hydrocarbon feedstock in said separator to form a vapor phase and a liquid bottoms phase containing said resid;
   (d) passing at least a portion of said resid-containing liquid bottom phase from said separator to a thermal conversion reactor where the resid-containing liquid bottoms phase is heated to 649° C. or more, wherein said thermal conversion reactor contains coke particles, said reactor having a coke particle/fresh feed ratio (wt/wt) of at least 1:1, based on the weight of circulating coke solids and fresh feed entering the reactor; and
   (e) converting at least a portion of said resid into olefins;
   (f) mixing said resid-containing liquid bottoms phase with an effluent from a fluidized catalytic cracking (FCC) reactor containing FCC catalyst fines, prior to passing said liquid bottoms phase to said thermal reactor wherein the concentration of FCC catalyst fines achieves a steady state level between 5 wt. % and 25 wt. % of the circulating solids.

2. The process of claim 1, wherein said thermal conversion reactor is a transfer line reactor and the coke particle/fresh feed ratio (wt/wt) in the transfer line reactor is in the range of about 3:1 to about 30:1.

3. The process of claim 1, wherein said thermal conversion reactor is a transfer line reactor in fluid communication with a fluidized coker, and further comprising combining said resid-containing liquid bottoms phase with coke particles extracted from said fluidized coker to form a fluidized mixture within said transfer line reactor.

4. The process of claim 3, further comprising separating said coke particles from said olefins exiting said transfer line reactor and passing said coke particles into a steam-air gasifier incorporated within said fluidized coker.

5. The process of claim 1, wherein said hydrocarbon feedstock is heated in a convection section of a steam cracking furnace, and said vapor/liquid separator is in fluid communication with said steam cracking furnace.

6. The process of claim 1, wherein said hydrocarbon feedstock contains between 10 wt % and 50 wt % of 566° C.+ resid.

7. The process of claim 1, wherein said olefins are combined with a product stream from a steam cracking furnace.

8. The process of claim 1, wherein the temperature within the thermal conversion reactor is 700° C. to 800° C.

9. The process of claim 1, wherein the resid is a 566° C.+ resid having a TAN of at least 0.1.

10. The process of claim 1, wherein the resid is a 566° C.+ resid having a $C_5$ asphaltenes content of at least 0.04 grams of $C_5$ asphaltenes per gram of resid.

11. The process of claim 1, wherein the resid is a 566° C.+ resid obtained from crudes from one or more of the following regions of the world: U.S. Gulf Coast, southern California, north slope of Alaska, Canada tar sands, Canadian Alberta region, Mexico Bay of Campeche, Argentinean San Jorge basin, Brazilian Santos and Campos basins, Egyptian Gulf of Suez, Chad, United Kingdom North Sea, Angola Offshore, China Bohai Bay, China Karamay, Iraq Zagros, Kazakhstan Caspian, Nigeria Offshore, Madagascar northwest, Oman, Netherlands Schoonebek, Venezuelan Zulia, Malaysia, and Indonesia Sumatra.

12. The process of claim 1, wherein $C_2$-$C_4$ hydrocarbons are produced in the thermal conversion reactor and said $C_2$-$C_4$ hydrocarbons are further converted by recycling to a steam cracking furnace.

13. The process of claim 4, wherein oxygen or oxygen-enriched air is introduced into the steam-air gasifier.

14. The process of claim 4, where at least one cyclone separator is used to separate said coke particles from said olefins exiting said transfer line reactor.

15. A process for cracking a hydrocarbon feed containing resid, comprising:
   (a) heating a hydrocarbon feedstock containing from 10 wt. % to 50 wt. % of 566° C.+ resid;
   (b) passing said heated hydrocarbon feedstock to a vapor/liquid separator;
   (c) flashing said heated hydrocarbon feedstock in said separator to form a vapor phase and a liquid bottom phase containing said resid;
   (d) passing at least a portion of said resid-containing liquid bottom phase from said separator to a transfer line reactor where the resid-containing liquid bottoms phase is heated to 649° C. or more, said reactor having a coke particle/fresh feed ratio (wt/wt) in the reactor of about 3:1 to about 30:1; and
   (e) converting at least a portion of said resid into olefins;
   (f) mixing said resid-containing liquid bottoms phase with an effluent from a fluidized catalytic cracking (FCC) reactor containing FCC catalyst fines, prior to passing said liquid bottoms phase to said thermal reactor wherein the concentration of FCC catalyst fines achieves a steady state level between 5 wt. % and 25 wt. % of the circulating solids.

16. The process of claim 15, wherein the transfer line reactor is in fluid communication with a fluidized coker, and further comprising combining said resid-containing liquid bottoms phase with coke particles extracted from said fluidized coker to form a fluidized mixture within said transfer line reactor.

17. The process of claim 16, further comprising separating said coke particles from said olefins exiting said transfer line reactor and passing said coke particles into a steam-air gasifier incorporated within said fluidized coker.

18. The process of claim 17, wherein said hydrocarbon feedstock is heated in a convection section of a steam cracking furnace, and said vapor/liquid separator is in fluid communication with said steam cracking furnace.

19. The process of claim 15, wherein the transfer line reactor is operating at 700° C. to 800° C.

20. The process of claim 15, wherein the resid is a 566° C.+ resid having a TAN of at least 0.1.

21. The process of claim 15, wherein the resid is a 566° C.+ resid having a $C_5$ asphaltenes content of at least 0.04 grams of $C_5$ asphaltenes per gram of resid.

22. The process of claim 1 where the coke particles are entrained in the fluid in the reactor.

23. A process for cracking a hydrocarbon feed containing resid, comprising:
   (a) heating a hydrocarbon feedstock containing from 10 wt. % to 50 wt. % of 566° C.+ resid having a TAN of at least 0.1 and a C5 asphaltenes content of at least 0.04 grams of C5 asphaltenes per gram of resid in a convection section of a steam cracking furnace;

(b) passing said heated hydrocarbon feedstock to a vapor/liquid separator in fluid communication with said steam cracking furnace;

(c) flashing said heated hydrocarbon feedstock in said separator to form a vapor phase and a liquid bottoms phase containing said resid;

(d) passing at least a portion of said resid-containing liquid phase from said separator to a a transfer line reactor operating at 700 to 800° C. or more and the coke particle/fresh feed ratio (wt/wt) in the transfer line reactor is in the range of about 3:1 to about 30:1; and (e) converting at least a portion of said resid into olefins;

(f) mixing said resid-containing liquid bottoms phase with an effluent from a fluidized catalytic cracking (FCC) reactor containing FCC catalyst fines, prior to passing said liquid bottoms phase to said transfer line reactor wherein the concentration of FCC catalyst fines achieves a steady state level between 5 wt. % and 25 wt. % of the circulating solids.

* * * * *